Feb. 22, 1966  J. E. KNAP  3,236,597
HIGH-PURITY DICOBALT OCTACARBONYL
Filed June 19, 1962
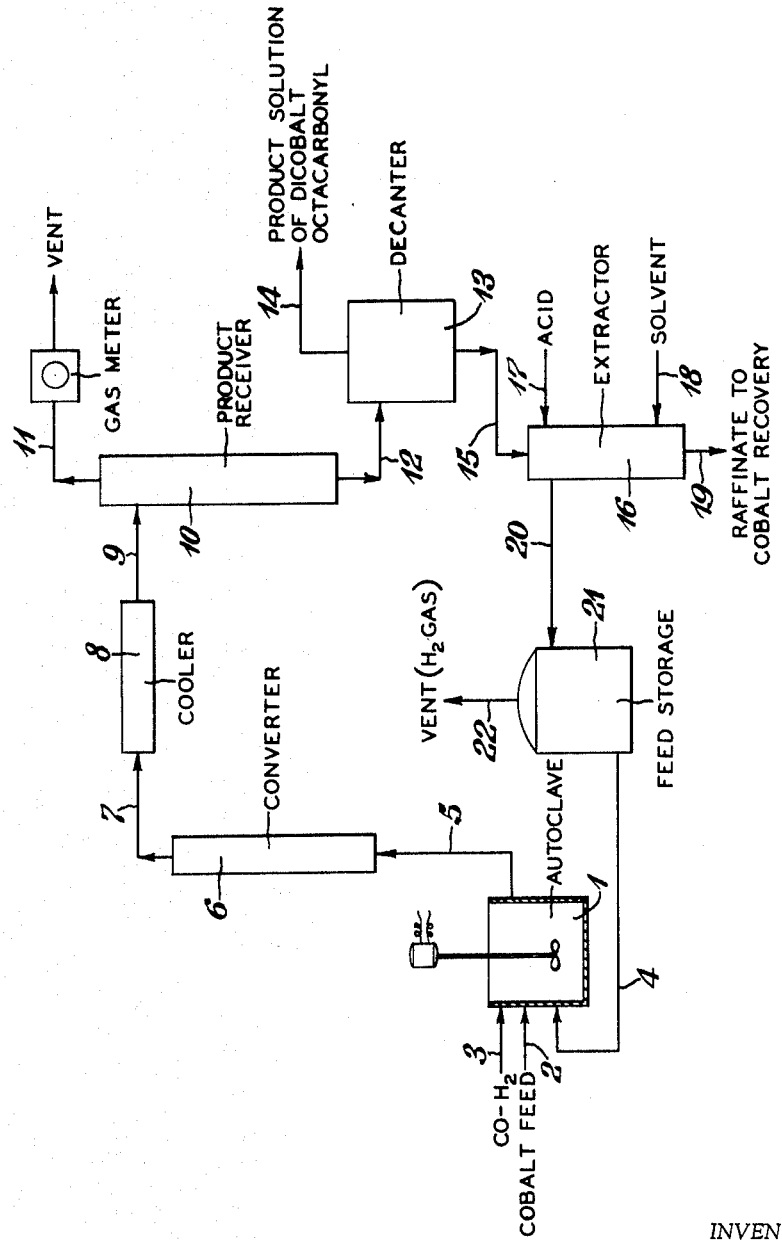
INVENTOR.
JAMES E. KNAP
BY
ATTORNEY

United States Patent Office 3,236,597
Patented Feb. 22, 1966

3,236,597
HIGH-PURITY DICOBALT OCTACARBONYL
James Eli Knap, Charleston, W. Va., assignor to Union
Carbide Corporation, a corporation of New York
Filed June 19, 1962, Ser. No. 203,628
6 Claims. (Cl. 23—203)

This invention relates to a process for the production of high-purity dicobalt octacarbonyl. More particularly this invention provides a novel method for the production of dicobalt octacarbonyl which is essentially free of by-product cobalt hydrocarbonyl.

It is well known in the art that oxygenated organic compounds, such as aldehydes, alcohols, esters, and the like, can be produced by reacting olefins with carbon monoxide and hydrogen at elevated temperatures and pressures in the presence of a cobalt catalyst. The catalysts employed in this hydroformylation reaction are usually the cobalt salts of organic and inorganic acids which can be added to the reactor in solutions, as slurries, or employed as a fixed bed catalyst. However, it has been discovered that regardless of the initial form in which the cobalt catalyst is introduced into the system, the active form of the catalyst, dicobalt octacarbonyl, is formed in situ under the conditions employed.

This synthesis of dicobalt octacarbonyl takes place by the reaction of a cobalt compound, such as the cobalt salt of an organic carboxylic acid, with hydrogen and carbon monoxide according to the following equation:

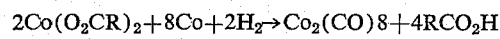
$$2Co(O_2CR)_2 + 8Co + 2H_2 \rightarrow Co_2(CO)_8 + 4RCO_2H$$

Although this reaction is eminently suitable for the production of dicobalt octacarbonyl for use as a catalyst in the hydroformylation process, attempts to adapt this synthesis to obtain dicobalt octacarbonyl in high purity have shown this reaction to be more complex.

In addition to the octacarbonyl formed in the above reaction, cobalt hydrocarbonyl can be formed directly from cobalt acetate as follows:

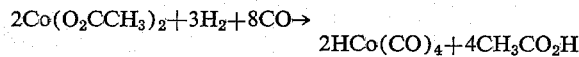
$$2Co(O_2CCH_3)_2 + 3H_2 + 8CO \rightarrow$$
$$2HCo(CO)_4 + 4CH_3CO_2H$$

Subsequently the hydrocarbonyl thus formed, being a strong acid, could displace the weaker acetate ion to give the cobalt salt of cobalt hydrocarbonyl:

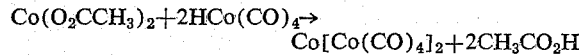
$$Co(O_2CCH_3)_2 + 2HCo(CO)_4 \rightarrow$$
$$Co[Co(CO)_4]_2 + 2CH_3CO_2H$$

Alternatively, the cobalt salt might be formed directly by the disproportionation of dicobalt octacarbonyl in the presence of water:

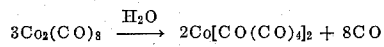
$$3Co_2(CO)_8 \xrightarrow{H_2O} 2Co[Co(CO)_4]_2 + 8CO$$

Any or all of the above reactions may be responsible for low yields of dicobalt octacarbonyl. Thus, attempts to produce dicobalt octacarbonyl in high purity heretofore have resulted only in extremely inefficient processes.

It is therefore an object of this invention to provide a novel process for the production of high-purity dicobalt octacarbonyl. A further object of this invention is to provide a novel process for the production of dicobalt octacarbonyl which is essentially free of cobalt hydrocarbonyl. Another object of this invention is to provide a novel process for the production of high-purity dicobalt octacarbonyl as a solution in an inert, organic solvent. A still further object is to provide a novel process for the preparation of dicobalt octacarbonyl in a high degree of efficiency. Another object is to provide a novel process for the production of high-purity dicobalt octacarbonyl from a cobalt salt of an organic carboxylic acid. A further object is to provide a novel process for the production of high-purity dicobalt octacorbonyl from a cobalt salt of an inorganic acid. These and other objects will readily become apparent to those skilled in the art in the light of the teachings herein set forth.

The novel process of this invention comprises contacting a cobalt compound with carbon monoxide and hydrogen in the presence of water and an inert water immiscible organic solvent in which dicobalt octacarbonyl is soluble, in a reaction zone at elevated temperature and superatmospheric pressure. The said cobalt compounds which may be employed are those which are essentially insoluble in the water immiscible organic solvent employed in the process. From the reaction zone are recovered an organic solvent phase containing dicobalt octacarbonyl and an aqueous phase containing cobalt hydrocarbonyl, the cobalt salt of cobalt hydrocarbonyl, and the unreacted cobalt compound in the feed. In this manner the two phases act to separate the carbonyl species produced by the reaction. The aqueous phase is separated and acidified, converting all the carbonylated cobalt therein to cobalt hydrocarbonyl. The cobalt hydrocarbonyl is then extracted from the acidified aqueous phase by contact and extraction with an organic solvent. The final step of the process involves a controlled dehydrogenation of the cobalt hydrocarbonyl to dicobalt octacarbonyl. The organic solvent solution of dicobalt octacarbonyl preferably is then recycled to the reaction zone to provide the organic solvent required therein during the reaction. Furthermore, such a recycle procedure results in a final product solution which has a high concentration of dicobalt octacarbonyl. If desired, fresh solvent may also be added to the reaction zone in addition to the solvent solution recycle stream.

The cobalt compounds which are suitable in this novel process are those which are insoluble in the water immiscible organic solvent employed. These cobalt species may either be soluble or insoluble in water. When water insoluble cobalt species such as cobalt metal, cobalt oxide, cobalt carbonate, and cobalt hydroxide are employed, the compounds are introduced to the reaction zone in finely divided form as a slurry or suspension in either the entering aqueous stream or the entering organic solvent stream. Water soluble cobalt salts such as the cobalt salts of lower carboxylic acids such as formate, acetate and proprionate as well as cobalt salts of inorganic acids such as sulfate, nitrate and the like may also be employed. When such compounds are used, they are introduced to the reaction zone in finely divided form as a slurry or suspension in the entering organic stream or dissolved in the entering aqueous stream.

The solvents which are suitable for use in the present invention have the characteristics of immiscibility with water and inertness to the reactants and reaction products under the process conditions. It is also necessary that the organic liquid be a solvent for dicobalt octacarbonyl. Such solvents include aromatic hydrocarbons such as benzene, toluene, xylene, ethyl benzene, cumene and the like, saturated hydrocarbons such as the hexanes, heptanes, octanes and the like, and cycloaliphatic hydrocarbons such as cyclohexane, methylcyclohexane and the like. Other suitable solvents include the water immiscible organic alkanols such as the $C_8$ and higher alkanols such as 2-ethyl-hexanol, sec-octanol, n-octanol, 2-nonanol, isodecanol, n-decanol, undecanol and the like and the dialkyl ethers such as diisopropyl ether, dibutyl ether and the like. Mixtures of the solvents may also be employed.

The molar ratio of hydrogen to carbon monoxide in the reaction zone at the start of the carbonylation should not be less than about 1:4 and may be as high as 4:1, the preferred range lying between 1:2 and 2:1. The hydrogen and carbon monoxide feed should generally be employed in stoichiometric excess, generally about 1.5 to about 100 times the stoichiometrically required quantity. However, if agitation in the reactor is provided by high gas flows, such as may be achieved by recycling the excess gas, excesses of up to 5000 times that stoichiometrically required may be used.

As the art is well apprised, the carbonylation step of the novel process may be conducted over a wide temperature range. Temperatures may vary from as low as about 80° C. to as high as about 220° C. A temperature range of about 150° to about 200° C. is preferred.

The carbonylation is conducted at superatmospheric pressures. The pressure may be from about 500 to about 12,000 pounds per square inch. Pressures in the upper range, although not inoperative give rise to operating difficulties, while pressures in the lower ranges generally tend to decrease the efficiency of the process. Therefore, a pressure in the range of from about 2000 to about 6000 pounds per square inch is preferred.

In the operation of the process, it is necessary to heat the mixture of hydrogen and carbon monoxide prior to introduction to the reaction zone. The heating of this mixture can be conducted in a separate preheater or in a preheater section as an integral part of an elongated reactor. This mixture must be at the operating pressure of the system. Similarly, the liquid streams entering the reaction zone are preheated to about the predetermined reaction temperature in a separate preheater under operating pressure, and then are mixed with the preheated mixture of carbon monoxide and hydrogen. It is necessary that the cobalt feed be admitted to the reaction zone at a rate no greater than in equimolar amounts to carbon monoxide. As hereinbefore discussed, generally an excess of carbon monoxide and hydrogen is preferred.

During the carbonylation step the total conversion of cobalt to one of the various carbonyls is generally in the order of about 60 to 90 percent. The cobalt which is not converted to the octacarbonyl, the hydrocarbonyl or the salt of the latter, can be recovered. Such cobalt recovery processes are well known in the art. If a water soluble organic compound is employed as a feed, the unreacted cobalt exists as a solution in the acidified aqueous layer after the extraction step. In this case, the cobalt may be precipitated by the addition of a hydroxide such as sodium hydroxide. The precipitated hydroxide may be recovered and recycled to the reaction zone as feed. Alternately, the hydroxide may be converted to another salt such as the acetate, and then may be recycled to the reaction zone. If a water insoluble cobalt compound is employed as feed, it remains in the aqueous phase in an undissolved state after the organic and aqueous phase leaving the extraction zone are permitted to separate. Subsequently it may be recovered and recycled to the reaction zone as with the precipitated cobalt above. By such recovery procedures, the overall conversion of cobalt to the octacarbonyl can be raised to a figure approaching 100 percent.

As hereinbefore pointed out, the cobalt compound may be introduced to the reaction zone either slurried or suspended in the organic solvent stream or dissolved or suspended in the aqueous stream entering the reaction zone. Liquids should be employed in the carbonylation step in an amount sufficient to permit free flow and prevent clogging of the reactor. The amount of organic solvent entering the reactor may vary over a wide range. The organic liquid stream may be composed entirely by the organic solvent extract stream containing dicobalt octacarbonyl recycled from the acidification step. Fresh solvent may also be added directly to the reaction zone to supplement the above said recycle stream. Normally, solutions containing about 10 to 20 percent dicobalt octacarbonyl are easily handled. Therefore, it is desirable to utilize an amount of organic liquid which will result in a product stream of approximately such concentration.

Likewise, the amount of water entering the reaction zone is not critical. The single pass conversion efficiency of cobalt to cobalt hydrocarbonyl or the salt thereof may be greater than that to dicobalt octacarbonyl. Therefore, since the hydrocarbonyl will exist in the aqueous layer after the carbonylation step, generally it is desirable that the water be present in the reaction zone in an amount greater than that of organic solvent. An aqueous phase from the carbonylation step should preferably contain from about 5 to about 15 percent by weight of cobalt hydrocarbonyl and the cobalt salt of cobalt hydrocarbonyl. The amount of water entering the reaction zone may be regulated in order to yield such concentrations.

The carbonylation reaction may be carried out in a vessel adaptable to effect the intimate contact of the reactants under the process conditions. An agitated autoclave may be used. It has been found that high pressure tubing of a size of about 3/16 inch to about 2 inches I.D. conveniently serve as reactors. Varying lengths of tubing may be employed, depending upon the intended capacity and throughput of the system. In the use of such a tubular reactor, the linear velocity of the reaction mixture through the reactor should be such that full turbulent flow is obtained. A residence time of about 10 to about 20 minutes is suitable for the reaction.

The acidification of the aqueous phase taken from the reaction zone may be effected by the addition of a strong mineral acid such as sulfuric acid. However, other strong acids may also be used. As hereinbefore pointed out, this aqueous phase contains cobalt hydrocarbonyl and the cobalt salt of cobalt hydrocarbonyl produced as by-products of the carbonylation step. The acid serves to liberate all the anion of cobalt hydrocarbonyl as cobalt hydrocarbonyl itself. After the acidification, the cobalt hydrocarbonyl will preferably exist in the organic solvent layer rather than in the acidified water layer. The concentration of the acid is not critical provided there is sufficient amount to liberate all of the cobalt hydrocarbonyl and render the aqueous layer acidic. Therefore, more than a slight excess of acid is unnecessary. The acidification and extraction can be performed in a continuous countercurrent extractor or in a batchwise manner. Standard equipment such as a packed column or rotary disc contactor may be employed.

Since the solubility of dicobalt octacarbonyl in organic solution decreases rapidly with decreasing temperature, it may be conveniently recovered in pure form from the organic solvent solution by low temperature crystallization and filtration or centrifugation. The pure material may thus be transferred to other solvents such as diethyl ether or acetone for use in chemical synthesis or to highboiling solvents such as n-octadecane or n-eicosane for cobalt plating purposes.

The invention will be better understood by reference to the schematic flow diagram shown in the accompanying drawing which is illustrative of one embodiment of the instant process.

In the system shown, an aqueous solution of a cobalt compound enters the reactor autoclave 1 through line 2. Hydrogen and carbon monoxide enter the reactor through line 3 and the organic solvent containing some dicobalt octacarbonyl enters through line 4. Mixing is carried out in the reactor autoclave to effect intimate contact between the reactants. The reactants are then sent through line 5 to a converter 6 wherein the carbonylation is continued. A single reactor could well replace the autoclave and converter used here. The reaction mixture leaves the converter through line 7 and is cooled in a cooler 8. The cooled mixture is conducted through line 9 to a product receiver 10 from which the unreacted hydrogen and carbon monoxide are vented through line 11. The liquid reaction products then are transferred from the said product receiver through line 12 to a decanter 13 where they are permitted to separate into an upper organic solvent phase and a lower aqueous phase. The organic solvent phase containing the dicobalt octacarbonyl is withdrawn through line 14 as the product. The aqueous phase passes through line 15 to extractor 16 where it is acidified with a strong acid entering through line 17 and contacted with organic solvent entering through line 18. The raffinate of this extraction comprises the aqueous phase containing unreacted cobalt and is withdrawn through line 19. The unreacted cobalt may be recovered from the raffinate as hereinbefore discussed. The organic solvent containing cobalt hydrocarbonyl is withdrawn as extract and is conducted through line 20 to a feed storage tank 21 where the cobalt hydrocarbonyl is converted to dicobalt octacarbonyl by controlled dehydrogenation, venting the hydrogen gas through line 22. The organic solution of dicobalt octacarbonyl is then recycled back to the reactor autoclave 1, through line 4.

The dehydrogenation of cobalt hydrocarbonyl to dicobalt octacarbonyl is accomplished by holding the hydrocarbonyl solution for a period of time in a vented vessel, for hydrogen release, which is thermostatically kept at a temperature sufficient to allow the hydrocarbonyl to lose hydrogen but not high enough to allow the dicobalt octacarbonyl to lose carbon monoxide.

$$2HCo(CO)_4 \rightarrow Co_2(CO)_8 + H_2$$

$$2Co_2(CO)_8 \rightarrow Co_4(CO)_{12} + 4CO$$

The second reaction can be minimized below 50° C., so temperatures in the range of 20–25° C. are used. Under these conditions the half life of a 0.34 molar solution has been measured at 21 minutes. So for practical purposes a retention time of 1–2 hours in the dehydrogenator is sufficient to provide an adequate solution for recycle to the high pressure reaction zone.

The following examples are illustrative.

EXAMPLE I

To a reactor composed of a one-gallon stirred autoclave and a 2-inch by 10-foot tube, were continuously fed an aqueous cobalt acetate solution and toluene. The reactor was pressurized to 6000 pounds per square inch with a gas stream consisting of a 1:1 ratio of hydrogen and carbon monoxide and was maintained at a temperature of 180° C. The reaction products were collected from the end of the tube through a cooler and pressure control valve. The effluent liquid was collected and the aqueous and organic layers were permitted to separate. Both phases were analyzed to determine single pass conversion data. The organic layer was withdrawn. To each 20 gallons of the remaining aqueous layer was added 15 gallons of toluene and 400 milliliters of 98% sulfuric acid. After agitation the aqueous phase was discarded and the toluene layer, containing dicobalt octacarbonyl was recycled to the reactor as the toluene stream. The following table lists the reaction conditions and data obtained:

*Table I*

|   | Run A | Run B |
|---|---|---|
| Cobalt acetate solution: |  |  |
| Percent cobalt | 7.8 | 7.4 |
| Feed rate, liters/hr | 11.8 | 11.9 |
| Toluene feed rate, liters/hr | 6.0 | 7.9 |
| Gas feed rate, s.c.f.h. | 236.9 | 248.5 |
| Dicobalt octacarbonyl: |  |  |
| Production rate, lb./hr | 2.45 | 2.87 |
| Yield, percent | 23.1 | 25.3 |
| Single pass results: |  |  |
| Overall cobalt conversion | 58.6 | 65.5 |
| Efficiency to octacarbonyl | 39.3 | 38.5 |
| Results using recycle procedure: |  |  |
| Overall cobalt conversion | 58.6 | 65.5 |
| Efficiency to octacarbonyl | 97.0 | 98.2 |

A typical production solution analysis was cobalt hydrocarbonyl, 0.27% dicobalt octacarbonyl, 14.8%.

EXAMPLE II

The following table shows the single-pass operation results obtained in operating the process at various temperatures and pressures. The cobalt compound used was cobalt carbonate; it was fed to the system suspended in toluene. The highest yields of total carbonyls and production rates were obtained at 6000 pounds per square inch and 180° C. The reactor employed consisted of a 1 inch x 12 foot tubular reactor in series with a 2 inch x 10 foot tubular reactor (total volume 8.37 liters). Also used were the above tubular reactors in series with an autoclave (total volume 12.2 liters).

*Table II.—Single pass operation results*

| | | | | | | | | |
|---|---|---|---|---|---|---|---|---|
| Run duration, hours | 3.0 | 2.0 | 3.0 | 5.0 | 2.0 | 4.0 | 2.0 | 2.0 |
| Reactor volume, liters | 12.2 | 8.37 | 8.37 | 8.37 | 8.37 | 8.37 | 8.37 | 8.37 |
| Temperature, ° C | 180 | 200 | 200 | 180 | 180 | 180 | 180 | 180 |
| Pressure, p.s.i.g. | 3,000 | 6,000 | 6,000 | 6,000 | 6,000 | 6,000 | 9,000 | 9,000 |
| Average liquid production rate, liters/hr | 3.8 | 6.20 | 8.13 | 11.7 | 20.45 | 12.9 | 9.7 | 5.9 |
| Synthesis gas feed rate, ft.³/hr | 120 | 159 | 218 | 160 | 208 | 264 | 243 | 223 |
| Grams of cobalt carbonate per gallon of slurry | 530 | 490 | 490 | 490 | 490 | 530 | 530 | 530 |
| Total carbonyl production ratio, lb./hr./ft.³ | .807 | 9.41 | 8.59 | 14.8 | 24.6 | 16.9 | 10.0 | 6.9 |
| Single pass yields, percent: | | | | | | | | |
| Total carbonyl | 24.4 | 89.5 | 82.6 | ª 96.5 | 94.3 | ª 92.3 | 72.5 | 81.9 |
| Cobalt hydrocarbonyl | 4.8 | 17.3 | 17.9 | | 10.7 | | 9.1 | 13.1 |
| Dicobalt octacarbonyl | 19.6 | 72.2 | 64.7 | | 83.6 | | 63.4 | 68.8 |
| Yield ratio, cobalt to octacarbonyl/cobalt to hydrocarbonyl | 4.12 | 4.18 | 3.62 | | 7.79 | | 6.99 | 5.3 |

Typical analyses of final high-purity dicobalt octacarbonyl solution:
Dicobalt octacarbonyl ---------------------------------------------------------------- 17.2, 16.0, 14.9
Cobalt hydrocarbonyl ----------------------------------------------------------------- Nil, Nil, 0.05

ª Yield to total carbonyl is calculated from gravity of product.

What is claimed is:

1. A process for the production of dicobalt octacarbonyl which comprises the steps of (1) contacting in a reaction zone, a cobalt species selected from the group consisting of cobalt metal, cobalt salts of carboxylic acids, cobalt salts of inorganic acids, cobalt hydroxide, cobalt carbonate, and cobalt oxide, with carbon monoxide and hydrogen in the presence of water and an inert water-immiscible organic solvent in which said dicobalt octacarbonyl is soluble, at a temperature of from about 80 to about 200° C. and superatmospheric pressure; said cobalt species being insoluble in the said organic solvent (2) recovering from said reaction zone an organic solvent phase containing dicobalt octacarbonyl and an aqueous phase containing cobalt hydrocarbonyl and the cobalt salts of cobalt hydrocarbonyl; (3) separating and acidifying said aqueous phase; (4) removing cobalt hydrocarbonyl from said aqueous phase by contact with an additional quantity of said organic solvent to obtain an extract containing said organic solvent and said cobalt hydrocarbonyl; and (5) dehydrogenating the said cobalt hydrocarbonyl in said extract to dicobalt octacarbonyl by maintaining said extract at a temperature of less than 50° C. and permitting the escape of hydrogen.

2. The process of claim 1 wherein said reaction zone is maintained at a pressure of from about 500 to 12,000 pounds per square inch.

3. A process for the production of dicobalt octacarbonyl which comprises (1) contacting in a reaction zone, a cobalt species selected from the group consisting of cobalt metal, cobalt salts of carboxylic acids, cobalt salts of inorganic acids, cobalt hydroxide, cobalt carbonate, and cobalt oxide, with carbon monoxide and hydrogen in the presence of water and an inert water-immiscible organic solvent in which said dicobalt octacarbonyl is soluble, said reaction zone maintained at a temperature of from about 80° C. to 220° C. and from about 500 to 12,000 pounds per square inch; said cobalt species being insoluble in the said organic solvent; (2) recovering from said reaction zone an organic solvent phase containing dicobalt octacarbonyl and an aqueous phase containing cobalt hydrocarbonyl and the cobalt salts of cobalt hydrocarbonyl; (3) separating and acidifying said aqueous phase; (4) removing cobalt hydrocarbonyl from said aqueous phase by contact with an additional quantity of said organic solvent to obtain an extract containing said organic solvent and said cobalt hydrocarbonyl; (5) dehydrogenating the said cobalt hydrocarbonyl in said extract to dicobalt octacarbonyl by maintaining said extract at a temperature of less than 50° C. and permitting the escape of hydrogen and (6) recycling said organic solvent containing the dicobalt octacarbonyl to said reaction zone.

4. A process for the production of dicobalt octacarbonyl which comprises (1) contacting a cobalt species selected from the group consisting of cobalt metal, cobalt salts of carboxylic acids, cobalt salts of inorganic acids, cobalt hydroxide, cobalt carbonate and cobalt oxide, with carbon monoxide and hydrogen in the presence of water and a water immiscible organic solvent in which said dicobalt octacarbonyl is soluble at a temperature of from about 80° C. to 220° C. and pressure of from about 500 to 12,000 pounds per square inch; said cobalt species being insoluble in the said organic solvent; (2) recovering from said reaction zone an organic solvent phase containing dicobalt octacarbonyl and an aqueous phase containing cobalt hydrocarbonyl and the cobalt salt of cobalt hydrocarbonyl; (3) separating and acidifying said aqueous phase; (4) removing cobalt hydrocarbonyl from said aqueous phase by contact with an additional quantity of said organic solvent to obtain an extract containing said organic solvent and said cobalt hydrocarbonyl; (5) dehydrogenating the said cobalt hydrocarbonyl in said extract to dicobalt octacarbonyl by maintaining said extract at a temperature of less than 50° C. and permitting the escape of hydrogen and (6) recycling said organic solvent containing the dicobalt octacarbonyl to said reaction zone.

5. The process of claim 4 wherein the water immiscible solvent is selected from the group consisting of aromatic hydrocarbons, and alkanols having at least 8 carbon atoms.

6. The process of claim 4 wherein said organic solvent is toluene.

References Cited by the Examiner
UNITED STATES PATENTS

| 2,473,993 | 6/1949 | Gresham | 23—203 |
| 2,476,263 | 7/1949 | McKeever | 23—203 |
| 2,477,553 | 7/1949 | McKeever | 23—203 |
| 2,477,554 | 7/1949 | McKeever | 23—203 |
| 2,985,504 | 5/1961 | Orchin | 23—14 |

OTHER REFERENCES

Blanchard: "The Volatile Metal Carbonyls," Chem. Reviews, vol. 21, No. 1 (Aug. 1937), pages 3–38.

Fernelius et al.: "Inorganic Syntheses," vol. 2, pages 238–242.

"Handbook of Chemistry and Physics," 43rd ed., page 564.

Sternberg et al.: "The Chemistry of Metal Carbonyls," J. A. C. S., vol. 76, pages 2717–20.

MAURICE A. BRINDISI, *Primary Examiner.*